Patented Sept. 3, 1940

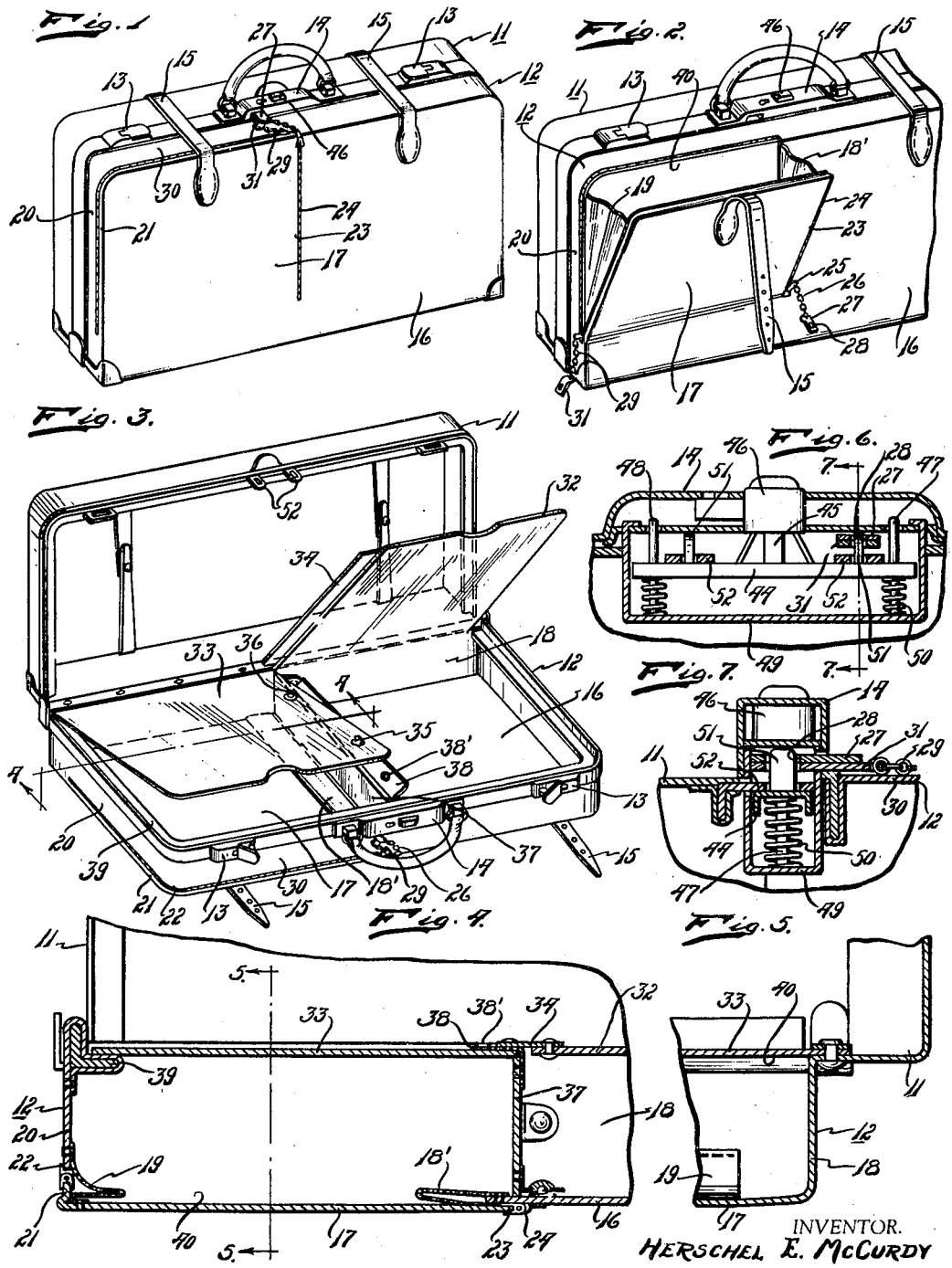

2,213,821

UNITED STATES PATENT OFFICE 2,213,821

TRAVELING BAG

Herschel E. McCurdy, Detroit, Mich.

Application November 24, 1937, Serial No. 176,198

1 Claim. (Cl. 190—51)

My invention relates to a new and useful improvement in a traveling bag and has for its object the provision of a traveling bag provided with a separate compartment positioned within the interior of the bag so arranged and constructed that access to the compartment may be had without requiring the opening of the bag itself.

Experience has shown that there is considerable inconvenience in being required to open a traveling bag to remove small articles therefrom. This is due to the fact that it frequently is a difficult task to open the bag which has been closely packed and also to the fact that by such opening and closing of the bag the contents thereof frequently become disarranged and crumpled.

Another object of the invention is the provision of a traveling bag having a compartment positioned interiorly thereof separate from the interior thereof and accessible from the exterior thereof without necessitating the opening of the bag itself.

Another object of the invention is the provision of a traveling bag so arranged and constructed that it is provided with a separate compartment accessible from the exterior and having parts which may be disconnected so as not to interfere with the ordinary use or arrangement of the traveling bag when it is not desired to use the separate compartment.

Another object of the invention is the provision of a traveling bag so arranged and constructed that various parts thereof may be easily and quickly assembled to provide a compartment separate from the remainder thereof and accessible from the exterior thereof without requiring the opening of the traveling bag itself.

Other objects will appear hereinafter.

The invention consists in the combination and arrangement of parts hereinafter described and claimed.

The invention will be best understood by a reference to the accompanying drawing which forms a part of this specification, and in which, Fig. 1 is a perspective view of a traveling bag embodying the invention.

Fig. 2 is a fragmentary, perspective view of a traveling bag embodying the invention showing the separate compartment opened from the exterior.

Fig. 3 is a perspective view of a traveling bag in open form showing the invention applied.

Fig. 4 is a fragmentary, sectional view taken on line 4—4 of Fig. 1.

Fig. 5 is a fragmentary, sectional view taken on line 5—5 of Fig. 4.

Fig. 6 is a fragmentary, sectional view through the locking mechanism of the invention.

Fig. 7 is a sectional view taken on line 7—7 of Fig. 6.

As shown in the drawing, the invention is illustrated as adapted for use on a traveling bag having a pair of box-like sections 11 and 12 hingedly connected together at one of their edges and adapted for being secured together with their edges in meeting relation when in closed position by means of the catches 13, a lock 14 and straps 15. The bottom of the section 12 is formed from parts 16 and 17, parts being formed integral with the wall 18 of the bottom section 12. As shown in Fig. 4 the parts 16 and 17 overlap at adjacent edges and are connected together by the flexible flap 18' which, when the part 17 is in closing position, doubles upon itself in bellows-like form. The opposite edge of the part 17 is connected by the flexible flap 19 to the end wall 20. The end edge of the part or flap 17 is turned at right angles to provide the portion 21 which is secured to the edge 22 of the end wall 20 by a releasable fastening mechanism or hookless slide fastener commonly known to the trade as a "Zipper," this fastener extending around the side edge and the upper edge of the flap or part 17. The edge 23 of the flap or part 17 which overlaps the adjacent edge of the part 16, is also secured to the part 16 by a releasable connection 24 which is of the "Zipper" type. An actuating tab 25 is used to control the opening and closing of this fastening and secured to the tab is a chain 26 carrying on its end a plate 27 having an opening 28 formed therein. A similar chain 29 is fastened to the tab which operates the connection along the edge which is fastened to the end wall 20 and the side wall 30. This chain 29 also carries an opening bearing plate 31.

In the lock 14 there is provided a cross-head 44 projecting upwardly from which is a stem 45 carrying the lock barrel 46. This cross-head is guided by the pair of guide pins 47 and 48 which project through openings formed in the cross-head 44 and which are mounted on and project upwardly from the bottom 49 of the housing. Springs 50 serve to normally press the cross-head upwardly so that the prongs 51 carried by the cross-head may project through the hasps 52 mounted on the section 11 to secure the sections 11 and 12 in closed relation. The device is so controlled that the plates 27 and 31 may be projected through the side of the housing into the path of the prongs 51 so that when the device is in closed position, the prongs 51 will project through the openings formed in the plates 27 and 31 and thus the flap or part 17 will be locked in closing position.

In a traveling bag of this type there is usually provided a central partition which is swingably mounted on one of the walls of one of the sections. In the invention I form this partition from two parts, 32 and 33, the part 32 carrying a plate 34 which is adapted to overlap the part 33. Attached to the bottom section 16 is a partition 37 which may lie flat upon the part 16 or be swung upwardly to the position at which it extends at right angles to the part 16. This partition is of such width that when it is swung upwardly at right angles to the part 16, it will be the same height as the depth of the section 12. This partition carries a flexible flap 38 which may be folded over the edge of the member 33 and secured thereto by snap fasteners, the flap 38 carrying one portion 38' of these fasteners and the part 33 carrying the other part 35 of the fasteners. When the flap 38 is folded over the edge of the part 33 and fastened thereto, the member 33 will be held in close engagement with the ledge 39 which extends around the section 12 and thus, there will be provided a compartment 40 within the traveling bag separate from the remainder of the traveling bag. When this bag is closed, access to the compartment 40 may be effected by releasing the "Zipper" connections and swinging the flap or section 17 into the position shown in Fig. 2, the strap 15 which is attached at one end to this flap or section being first unbuckled.

In this way there is provided an easy and quickly operated means for forming a compartment separate and distinct from the remainder of the traveling bag and also of affording access to this compartment from the exterior. Consequently, the user of the bag may pack small and frequently needed articles such as toilet articles in the compartment 40 thus formed and access to these articles had at all desirable times without disturbing the other contents of the traveling bag and without necessitating the opening of the bag.

When it is not desired to use the separate compartment, the partition 37 may be laid flat upon the inner face of the section 16 and the partition parts 32 and 33 snapped together. With the flap 17 secured in closed position, as shown in Fig. 1, the traveling bag may then be used in the usual manner.

It is believed that it will appear obvious that various modifications and changes might be made in the particular detail of structure arranged to form the separate compartment and to secure the various parts together. It is the intention to include within the present invention such modifications and changes as would appear to one skilled in the art and which may come within the scope of the appended claim.

What I claim as new is:

A traveling bag of the class described, comprising a pair of bag sections swingably connected together along one of their edges, a lock for locking said sections together and including a slidable prong carried by one section and releasably engaging a hasp carried by the other section, the bottom of one of said sections embodying an outwardly swingable flap; means for connecting opposite edges of said flap to said bottom for limiting the outward swinging movement thereof and permitting the closing of said flap; a partition-forming member swingably mounted at one of its edges on the inner surface of said bottom and extending transversely thereof, and adapted to lie flat against the said bottom when in one position and to extend vertically thereto when in another position; a central partition mounted on one of said sections and adapted upon the closing of said sections together, for separating the interior of said sections from each other, said partition comprising a pair of cooperating parts; means for securing one of said parts to and in engagement with said transversely extending partition-forming member upon the extension of the same vertically to form therewith a separate compartment in said section accessible from the exterior of said bag upon the outward swinging of said swingable flap; means for securing said partition parts together in alignment with each other; a pair of slide fasteners securing said flap against outward swinging movement, a plate having an aperture therethrough carried by each fastener, and said plates being adapted to be aligned with said hasp to permit said prong of said lock to pass through said apertures and lock said fasteners.

HERSCHEL E. McCURDY.